United States Patent
Hufnagl et al.

(10) Patent No.: US 6,868,757 B2
(45) Date of Patent: Mar. 22, 2005

(54) BLIND FASTENER AND NOSE ASSEMBLY FOR INSTALLATION OF THE BLIND FASTENER

(75) Inventors: Gerhart Hufnagl, Tucson, AZ (US); Gilbert M. Lee, Tucson, AZ (US); Randall G. Torrence, Tucson, AZ (US)

(73) Assignee: Huck International, Inc., Tucson, AZ (US)

( * ) Notice: Subject to any disclaimer, the term of this patent is extended or adjusted under 35 U.S.C. 154(b) by 30 days.

(21) Appl. No.: 10/442,910

(22) Filed: May 20, 2003

(65) Prior Publication Data

US 2004/0231467 A1 Nov. 25, 2004

(51) Int. Cl.$^7$ .......................... B25B 13/00; F16B 13/06
(52) U.S. Cl. .............................. 81/55; 411/38; 411/43; 411/55
(58) Field of Search .................. 81/55, 13; 411/43, 411/55, 57, 34, 37, 38

(56) References Cited

U.S. PATENT DOCUMENTS

| | | | |
|---|---|---|---|
| 2,030,167 A | | 2/1936 | Miller |
| 2,324,142 A | | 7/1943 | Eklund |
| 2,384,321 A | | 9/1945 | Lees, Jr. |
| 2,479,075 A | | 8/1949 | Martin |
| 2,760,399 A | * | 8/1956 | Rea ........................... 411/60.2 |
| 2,789,597 A | * | 4/1957 | La Torre ........................ 81/55 |
| 2,914,106 A | | 11/1959 | Boyd |
| 2,971,425 A | | 2/1961 | Blakeley |
| 3,136,203 A | | 6/1964 | Davis |
| 3,143,917 A | | 8/1964 | Conner |
| 3,196,918 A | | 7/1965 | Hampton |
| 3,203,303 A | | 8/1965 | Laisy |
| 3,236,143 A | | 2/1966 | Wing |
| 3,279,304 A | | 10/1966 | Hopkins |
| 3,322,449 A | | 5/1967 | Becker |
| 3,345,900 A | | 10/1967 | Villo |
| 3,365,998 A | | 1/1968 | Zahodiakin |
| 3,453,927 A | | 7/1969 | Moore |
| 3,653,294 A | | 4/1972 | Nason |
| 4,237,768 A | | 12/1980 | Volkmann |
| 4,376,604 A | | 3/1983 | Pratt et al. |
| 4,405,273 A | | 9/1983 | Ruhl et al. |
| 4,457,652 A | | 7/1984 | Pratt |
| 4,630,510 A | * | 12/1986 | Belanger ........................ 81/55 |
| 4,810,141 A | | 3/1989 | Rainville |
| 4,836,062 A | * | 6/1989 | LaTorre ........................ 81/55 |
| 5,135,340 A | | 8/1992 | Stinson |
| 5,498,110 A | | 3/1996 | Stencel et al. |
| 5,634,751 A | | 6/1997 | Stencel et al. |
| 5,913,648 A | * | 6/1999 | Lin .............................. 411/43 |
| 6,247,883 B1 | | 6/2001 | Monserratt |

* cited by examiner

*Primary Examiner*—Hadi Shakeri
(74) *Attorney, Agent, or Firm*—David P. Maivald; Eckert Seamans Cherin & Mellott, LLC (57) ABSTRACT

A blind fastener for securing a plurality of workpieces is provided that has a sleeve, and a pin member. In an alternate embodiment, the blind fastener has a sleeve, a pin member and a nut. The sleeves have a head with a plurality of rearwardly sloping recesses disposed therein. The recesses are adapted to be engaged with a plurality of rearwardly sloping nibs disposed on one end of a nose secured to an installation tool. The pin members have a splined head adapted to be engaged with a splined driver secured to an installation tool. Use of the splined head on the pin member, the splined driver, rearwardly sloping recesses on the sleeve, and rearwardly sloping nibs on the nose eliminates camming out of the nibs from the recesses during installation of the blind fastener. A nose assembly for installation of the blind fastener is also provided.

8 Claims, 7 Drawing Sheets

BLIND FASTENER AND NOSE ASSEMBLY FOR INSTALLATION OF THE BLIND FASTENER

FIELD OF THE INVENTION

This invention relates to blind fasteners for securing workpieces together, and more particularly to a blind fastener and nose assembly for installation of the blind fastener.

BACKGROUND OF THE INVENTION

Blind fasteners are commonly used to secure workpieces together when it is otherwise impossible to access the blind side of one of the workpieces. Typically, the workpiece that is accessible by an end-user is referred to as the accessible side workpiece and the workpiece that is inaccessible by an end-user is referred to as the blind side workpiece.

Blind fasteners have wide application in the aerospace industry. In aerospace applications, the blind fastener assembly of the present invention can be used to secure workpieces made of aluminum alloy, other metallic alloys, composites or combinations thereof.

An example of a previously available blind fastener is disclosed in U.S. Pat. No. 2,971,425. The principle components of the blind fastener of this prior art patent are a screw, a bushing, and a threaded nut. Generally, this prior art screw, bushing and threaded nut are similar in construction in certain aspects to the pin member and sleeve of the present invention. Distinctions between this prior art fastener and the present invention will focus on the embodiment of the prior art fastener that has recesses disposed in the head of the bushing that is adapted receive nibs of a nose that is affixed to a standard installation tool.

To install this prior art fastener, a nose with a plurality of nibs disposed on one side of the exterior surface thereof is provided that is affixed to a standard installation tool. Also, a driver configured to engage the driving head of the screw is provided that is affixed to the standard installation tool. The driver is engaged with the driving head of the screw and the nibs of the nose are disposed within the recesses of the bushing. The recesses in the bushing of this prior art fastener would need to be relatively deep like the recesses used in the commercial embodiments of the fasteners shown and described in U.S. Pat. Nos. 5,498,110 and 5,634,751. The deep recesses are needed in order to promote engagement between the nibs of the nose and the recesses of the bushing. Unfortunately, the use of deep recesses would weaken the bushing. In operation, the driver would rotate the screw and the nibs of the nose would engage the recesses in the head of the bushing in an attempt to prevent rotation of the bushing relative to the screw. Formation of the blind side bulb is supposed to be facilitated by threading the screw into the stationary bushing.

Such an operation would not effectively form the blind side bulb to clamp a plurality of workpieces together because the nibs of the nose would cam-out of the recesses during the installation of this prior art fastener. When the nibs cam-out of the recesses, the bushing rotates relative to the nose thereby causing wear damage to the nibs of the nose due to the abrasion of the nibs rotating against the head of the bushing. As can be appreciated, the nose would need to be frequently replaced due to the wear the nibs would experience in such a system. Additionally, the rotation of the bushing relative to the screw is undesirable from the standpoint of forming the blind side bulb. Optimum installation performance and reliability in bulb formation are not achieved with such an approach.

Rotation of the bushing would also cause abrasion or scraping of the head of the bushing by the nibs rotating against the head of the bushing. These results are not only visually apparent, but can also deteriorate the corrosion resistant properties of the bushing. Factors such as improper bulb formation, inconsistent structural clamp up and shear strength compromise the integrity of this prior art blind fastener.

With this prior art fastener, an end-user of the fastener attempts to prevent cam-out of the nibs from the recesses of the bushing by exerting a pushing force against the installation tool in order to maintain the engagement of the nibs with the recesses of the bushing. As can be appreciated, the end-user would become fatigued with applying such a force against the installation tool.

Of particular distinction to U.S. Pat. No. 2,971,425, the recesses in the head of the sleeve of the present invention slope rearwardly towards the blind side workpiece. These recesses are adapted to be engaged with nibs disposed on one end of a nose of a nose assembly affixed to a standard rotary installation tool. These nibs also slope rearwardly towards the blind side workpiece. Engagement of the sloping nibs with the sloping recesses is particularly advantageous in preventing rotation of the sleeve relative to the pin member during installation of the blind fastener of the present invention. Utilization of sloping nibs and recesses eliminates cam-outs. As such, the problems associated with cam-outs related to the design of U.S. Pat. No. 2,971,425 is eliminated. Additionally, by eliminating the cam-out problem associated with prior art fasteners by using the rearwardly sloping nibs and recesses, the recesses of the present invention are relatively shallow as compared to the deep recesses used in the commercial embodiment of the fasteners shown and described in U.S. Pat. Nos. 5,498,110 and 5,634,751. The shallow recesses of the present invention do not significantly weaken the sleeve of the present invention like the deep recesses used in the prior art.

Additionally, the driving head of the pin member of the present invention has splines or threads disposed on the exterior surface of the driving head. As used herein, the term "splines" means splines or threads. These splines are adapted to be engaged with a splined driver of a nose assembly affixed to a standard rotary installation tool. The splined engagement between the driving head and the driver is particularly advantageous in simultaneously pulling the installation tool towards the fastener during actuation of the tool to ensure proper engagement of the nibs with the recesses and rotatably torquing the pin member to effectively form the blind side bulb of the fastener. The pulling feature of the splined engagement between the pin member and driver to ensure engagement of the nibs with the recesses also eliminates the problems associated with cam-outs related to the design of U.S. Pat. No. 2,971,425.

SUMMARY OF THE INVENTION

It is an object of the invention to provide a blind fastener that pulls an installation tool towards the blind fastener during installation of the blind fastener.

It is another object of the invention to provide a blind fastener that does not have an installation tool cam out of the blind fastener during installation of the blind fastener.

It is another object of the invention to provide a blind fastener that has a sleeve component with relatively shallow recesses that do not significantly weaken the sleeve.

It is another object of the invention to provide a nose assembly that pulls an installation tool towards the blind fastener during installation of the blind fastener.

It is another object of the invention to provide a nose assembly that does not cam out of the blind fastener during installation of the blind fastener.

Certain objects of the invention are obtained by providing a blind fastener for securing a plurality of workpieces together. The workpieces have an accessible side workpiece and a blind side workpiece. The blind fastener has a sleeve with a body that is internally threaded at one end of the sleeve and a head at the other end of the sleeve. The threaded portion of the sleeve is adjacent to an internally smooth portion of the sleeve. The threaded portion of the sleeve transitions to the smooth portion of the sleeve, and the smooth portion of the sleeve has a reduced wall thickness relative to the threaded portion of the sleeve. The head has a plurality of rearwardly sloping recesses disposed in the head of the sleeve that are adapted to be engaged with a plurality of rearwardly sloping nibs disposed on one end of a nose secured to an installation tool. The recesses are relatively shallow. The blind fastener additionally has a pin member with an elongated shank. The shank has a straight smooth portion received within the smooth portion of the sleeve and a threaded portion at one end of the pin member that is threadedly engaged with the threaded portion of the sleeve. The pin member has a first head adjacent to the shank that is seated within the sleeve and a second splined head positioned at the other end of the pin member. The pin member has a breakneck groove between the first head and the second head. The breakneck groove is adapted to fracture in torsional shear in response to a relative rotational force applied to the fastener with an installation tool that facilitates threading of the threads of the pin member with the threads of the sleeve, and deforming into a bulb that portion of the sleeve that is of a reduced wall thickness relative to the threaded portion of the sleeve which is adjacent to an outer surface of the blind side workpiece.

Other objects of the invention are obtained by providing an alternate blind fastener for securing a plurality of workpieces together. The blind fastener has a generally tubular sleeve body received within openings in the workpieces. The sleeve body has a rearward tapered end projecting rearwardly beyond the blind side workpiece, and an enlarged body head for engagement with the outer surface of the accessible side workpiece. The head has a plurality of rearwardly sloping recesses disposed in the head of the sleeve that are adapted to be engaged with a plurality of rearwardly sloping nibs disposed on one end of a nose secured to an installation tool. The recesses are relatively shallow. The blind fastener also has a pin member that is identical to the pin member described in the paragraph above. The blind fastener additionally has a nut with an internally threaded bore threadedly engaged with the threads of the pin member. One end of the nut is located adjacent to the rearward tapered end of the sleeve body and is adapted to be engaged with the rearward tapered end of the sleeve body in response to a relative installation force applied to the fastener with an installation tool that facilitates threading of the threads of the pin member with the threads of the nut and deformation of the one end of the nut into a bulb to secure the plurality of workpieces together as the nut is pulled over the rearward tapered end of the sleeve body.

Other objects of the invention are obtained by providing a nose assembly adapted to install either of the blind fasteners described above. The nose assembly has a nose, a driver, an ejector and a spring. The nose has an internal bore, and one end of the nose has a plurality of rearwardly sloping nibs disposed thereon that are adapted to engage the rearwardly sloping recesses disposed in the sleeve of the blind fastener. The other end of the nose is adapted to be secured to an installation tool. The driver has an internal bore, and one end of the driver has a portion of the internal bore with splines disposed therein that are adapted to engage the splined head of the pin member. The other end of the driver is adapted to be secured to an installation tool. The driver is disposed within the internal bore of the nose and rotatably movable within the bore relative to the nose. The ejector is disposed in the internal bore of the driver, and is adapted to eject the splined head of the pin member after it has been set. The spring is disposed in the internal bore of the driver, and applies a relative axial force on the ejector to engage the ejector with the splined head of the pin member.

DETAILED DESCRIPTION OF PREFERRED EMBODIMENTS

Figure 1:
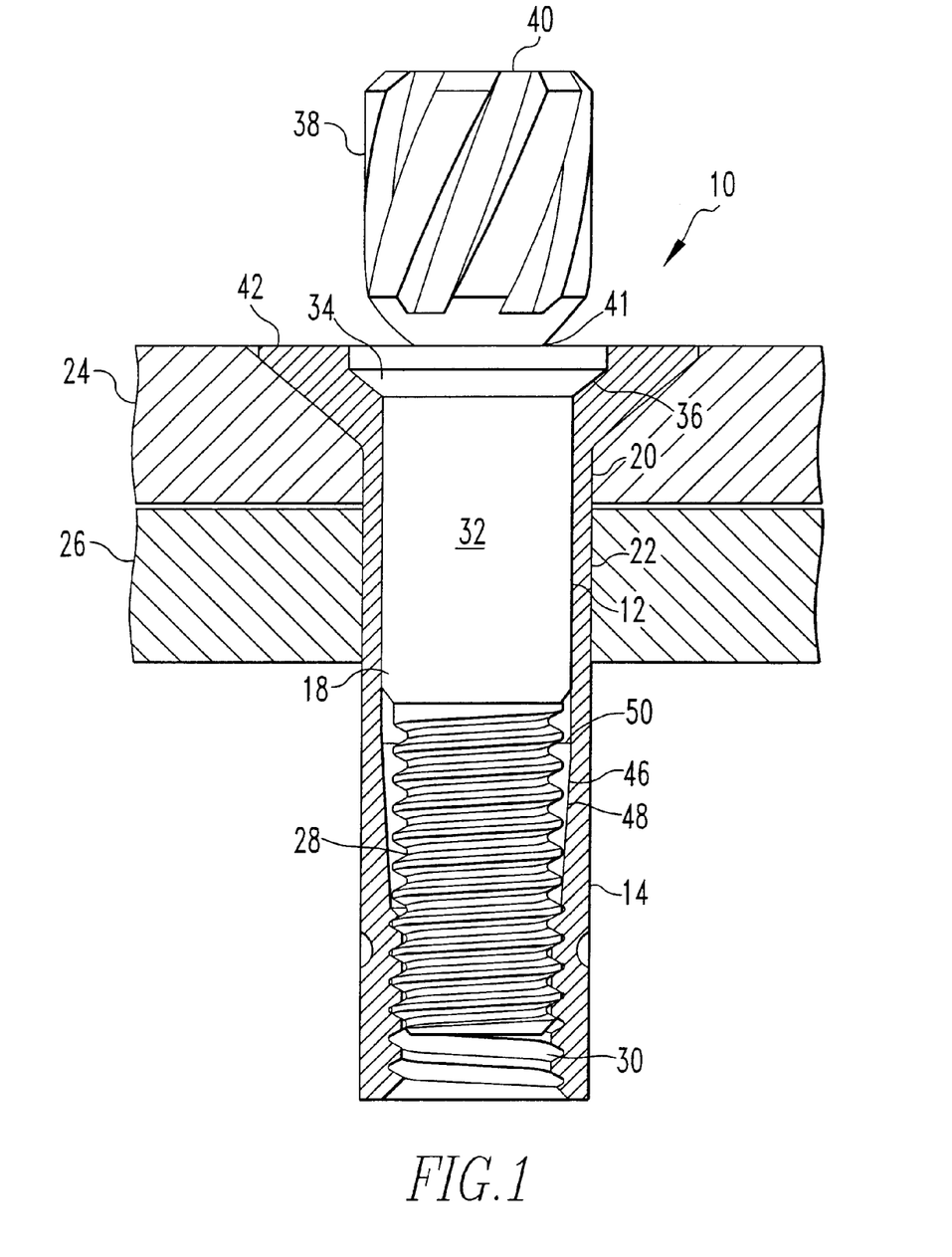
FIG. 1 is a partial cross-sectional view of the fastener of the present invention showing the components of the fastener after the fastener has been inserted through aligned openings in a plurality of workpieces.

Looking now to FIG. 1, a fastener 10 is shown to include a pin member 12 and a sleeve 14. In the fastener industry, pin member 12 may be referred to as a bolt, a screw, a spindle or a stem and sleeve 14 may be referred to as a bushing, nut or nut body. Pin member 12 has an elongated shank 18 which extends through aligned openings 20 and 22 in a pair of workpieces 24 and 26, respectively, to be secured together. A threaded portion 28 at one end of shank 18 is adapted to threadedly engage an internally threaded portion 30 of the sleeve 14 that is an integral component of the sleeve 14. The threaded portion 28 of the shank 18 has a diameter that is less than a smooth portion 32 of the shank 18 adjacent to the threaded portion 28. The pin member 12 is provided with a head 34 adjacent to the smooth portion 32 that is adapted to seat on an annular, outwardly facing, seat 36 at the outer end of the sleeve 14. In the particular construction illustrated, the head 34 is frustoconical and the seat 36 is complementarily tapered so that the pin member 12 is countersunk into the sleeve 14. Adjacent to the head 34 and also forming a portion of the pin member 12 is another head 38 having splines or threads 40 that are engageable by a suitable driver attached to an installation tool. Between the heads 34 and 38 is a breakneck groove 41 that defines the weakest point of the pin member 12 that is adapted to fracture in torsional shear in response to the rotational force applied to head 38 after the fastener 10 has been set, thereby providing the pin member 12 with a flush configuration relative to the sleeve 14 after the fastener 10 has been set.

The sleeve 14 has a body that has a cylindrical shape with a smooth exterior surface that has a slight clearance fit or press fit through openings 20 and 22 of the workpieces 24 and 26. The sleeve 14 also has a head 42 at one end that is typically sunk flush with the outside surface of the accessible side workpiece 24. Alternatively, the head 42 could be protruding from the outer surface of the accessible side workpiece 24. The head 42 could have a round head, hex head or other suitable shape as is well known in the fastener industry. The sleeve 14 has an internally threaded portion 30 at the other end of the sleeve 14 that is adapted to threadedly engage the threaded portion 28 of the pin member 12. The threaded portion 30 has a greater thickness than an internal smooth portion 46 of the sleeve 14. The wall thickness of the smooth portion 46 is greatest adjacent to the threaded portion 30. In one embodiment, the thickness of the smooth portion 46 is gradually reduced along a tapered section 48 of the sleeve 14 to a location 50 outside the blind side workpiece 26. At such location 50, the wall thickness of the smooth portion 46 of the sleeve 14 remains substantially the same until reaching the head 42 of the sleeve 14. The tapered section 48 of the sleeve 14 intended for bulb 52 formation is optionally locally induction annealed in order to facilitate bulb 52 formation. The tapered section 48 additionally facilitates bulb 52 formation against the blind side workpiece 26 in substantially all grip ranges of the fastener 10. In an alternate embodiment, the thickness of the smooth portion 46 could be abruptly reduced by a step (not shown) in the sleeve 14 to a wall thickness that remains substantially the same until reaching the head 42 of the sleeve 14. The smooth portion 46 of the sleeve 14 adjacent to the outer surface of workpiece 26 with reduced wall thickness relative to the threaded portion 30 could be locally induction annealed in order to facilitate bulb 52 formation.

Figure 3:
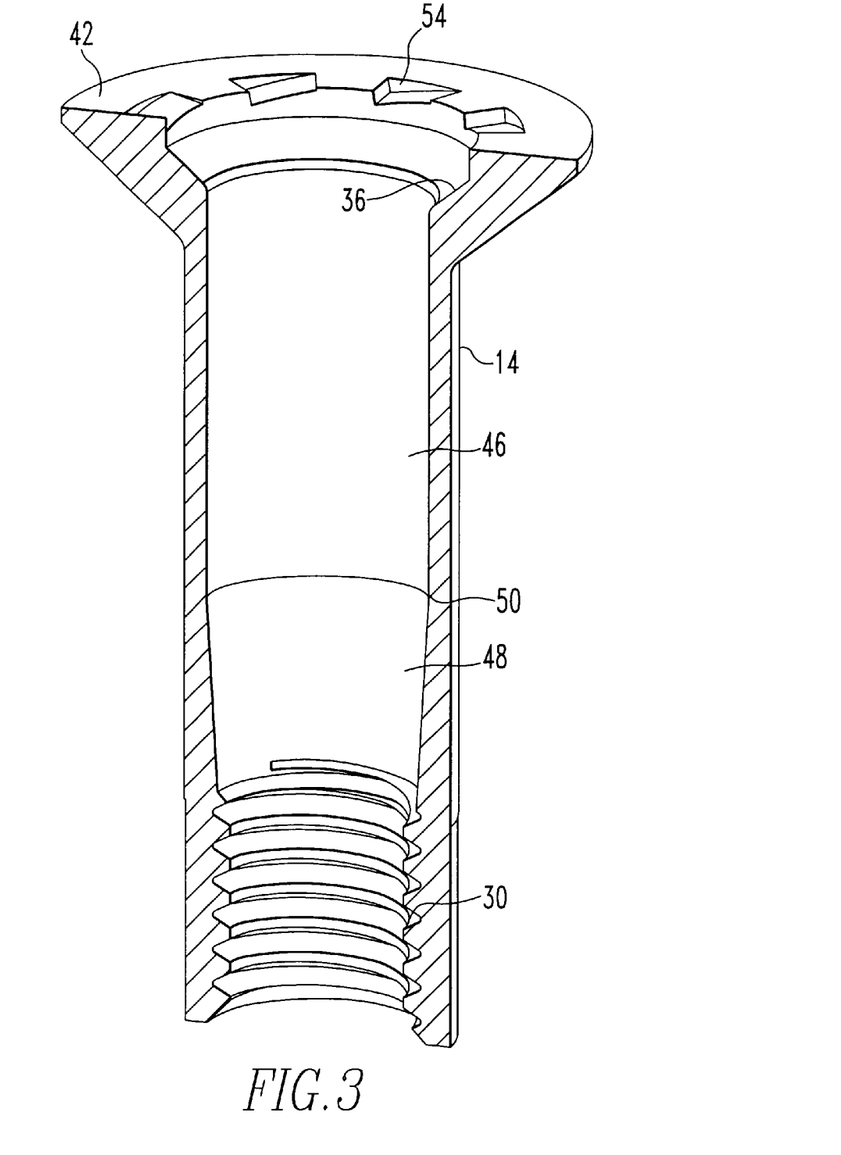
FIG. 3 is a cross-sectional isometric view of the sleeve of the present invention showing a plurality of sloped recesses disposed in the head of the sleeve.
Figure 4:
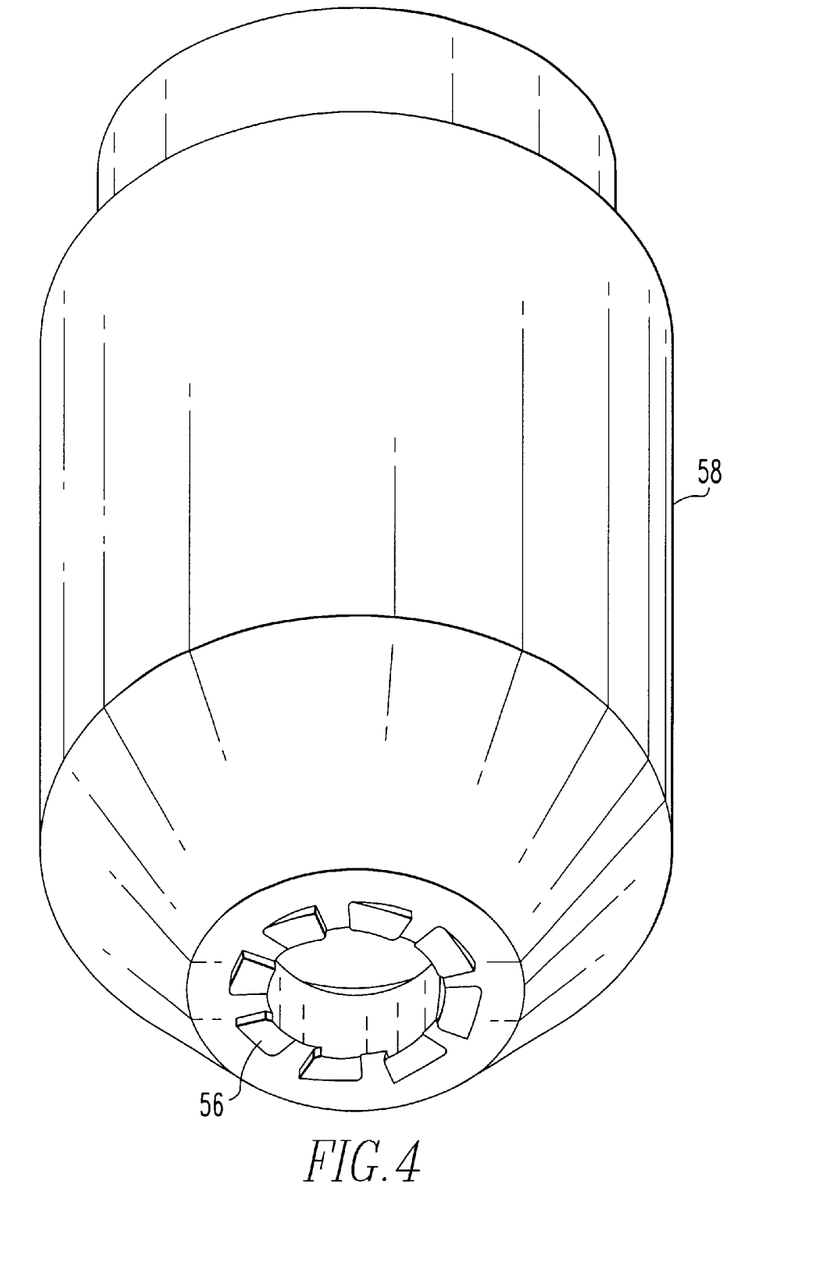
FIG. 4 is a bottom isometric view of the nose of the present invention showing a plurality of sloped nibs disposed on one end of the nose.
Figure 5:
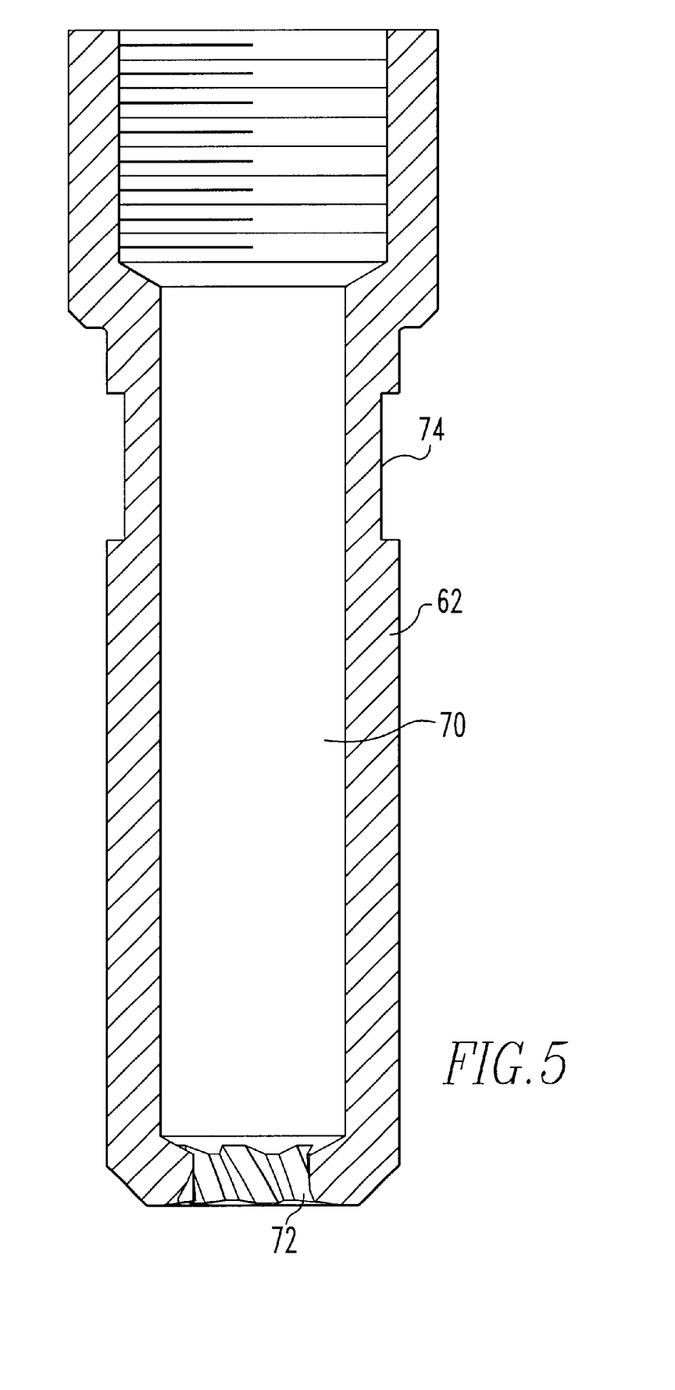
FIG. 5 is a cross-sectional view of the driver of an installation tool of the present invention showing a splined portion disposed within an internal bore of the driver.

With reference to FIG. 3, the head 42 of the sleeve 14 has a plurality of recesses 54 disposed therein that are adapted to receive a plurality of protruding nibs 56 of the nose 58 of FIG. 4. Preferably, the recesses 54 slope rearwardly toward the blind side workpiece 26 and are relatively shallow. The relatively shallow construction of the recesses 54 does not significantly weaken the sleeve 14 of the present invention like the deep recesses used in prior art blind fasteners. The plurality of recesses 54 are disposed in the head 42 of the sleeve 14 in a generally circular orientation. The circular orientation is particularly advantageous in that the circular orientation does not weaken the head 42 by using cross recesses. Alternatively, the recesses 54 can be formed in any configuration that allows the head 42 of the sleeve 14 to be engaged with the nibs 56. For example, the recesses 54 could be in the orientation of a hexagon, a square, a cross-slot configuration, or a single slot configuration as long as the nibs 56 of the nose 58 have a matching configuration.

Likewise, as with the recesses 54, the number of nibs 56 can vary and can be in many different orientations and forms. The plurality of nibs 56 can be formed in any configuration that allows the head 42 of the sleeve 14 to be engaged with the nose 58. In FIG. 4, the nibs 56 are disposed on the nose 58 in a generally circular orientation. Alternatively, the nibs 56 could be in the orientation of a hexagon, a square, a cross slot configuration, or a single slot configuration as long as the recesses 54 of the sleeve 14 have a matching configuration. Preferably, as with the recesses 54, the nibs 56 slope rearwardly toward the blind side workpiece 26. As previously mentioned, the rearward slope of the recesses 54 and nibs 56 is particularly advantageous in eliminating any camming out of the nose 58 from the sleeve 14 during setting of the fastener 10. Additionally, the nibs 56 are preferably made of a non-deformable material such that the nibs 56 will not deform during installation of the fastener 10.

Figure 6:
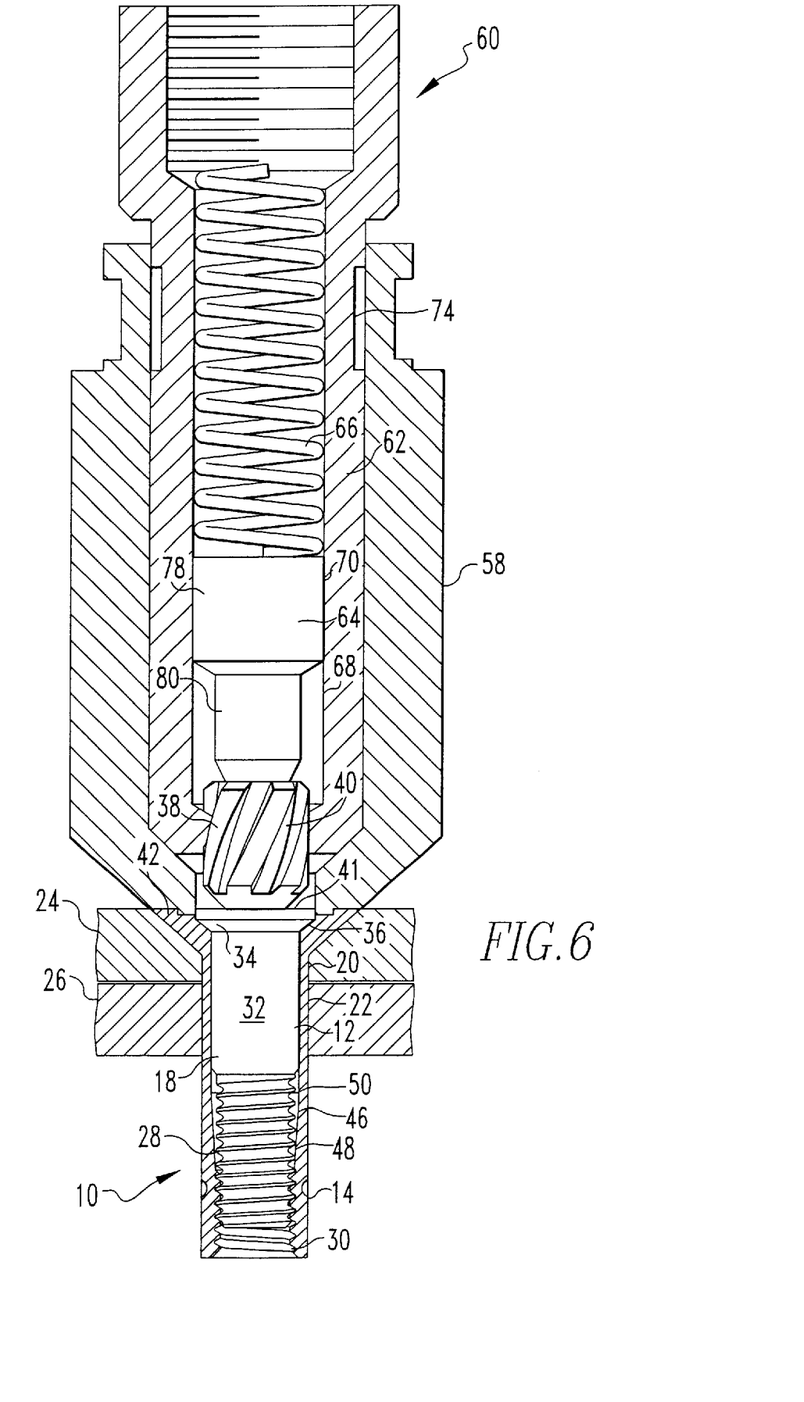
FIG. 6 is a partial cross-sectional view of the fastener and nose assembly of the present invention showing the components of the fastener and the nose assembly engaged with the fastener after the fastener has been inserted through aligned openings in a plurality of workpieces.
Figure 7:
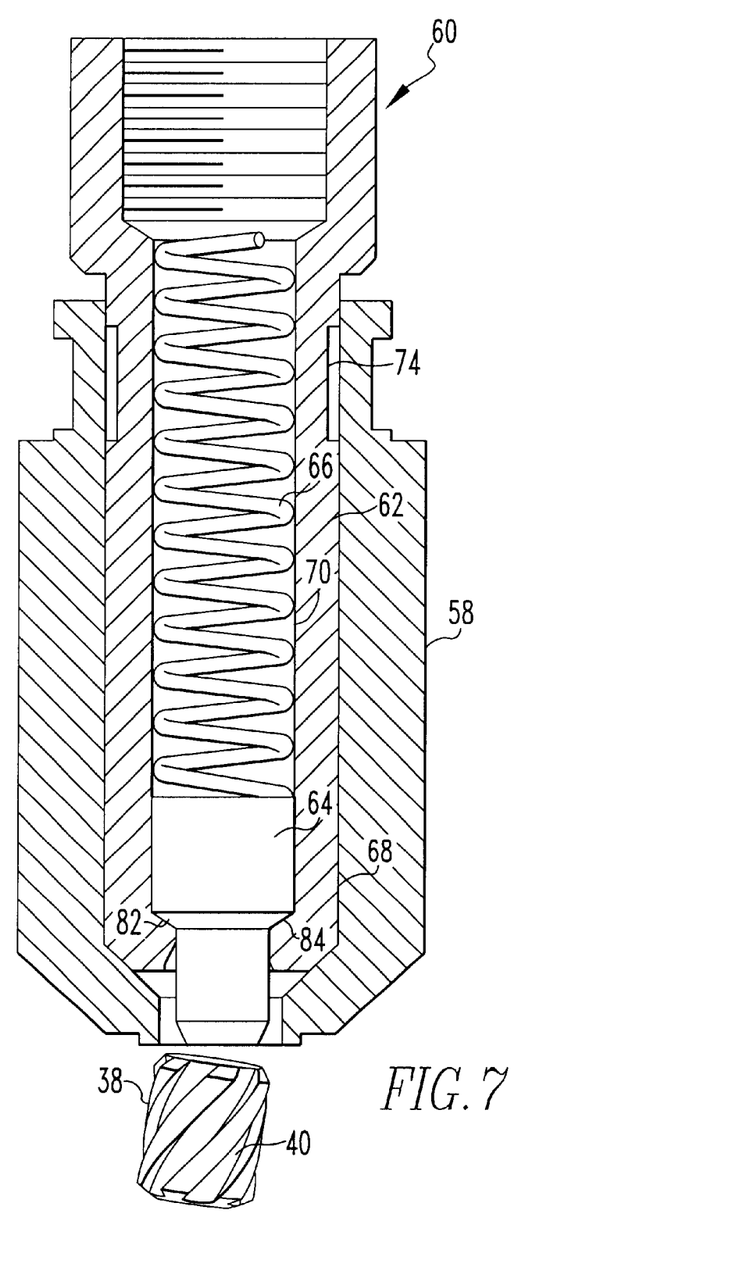
FIG. 7 is a partial cross-sectional view of the splined head of the fastener and nose assembly of the present invention showing these components after the fastener has been set.

With reference to FIG. 6, a nose assembly 60 is shown that is attached to a standard rotary installation tool (not shown). Details of the installation tool have been omitted for the purpose of simplifying the FIGS. and describing the details of the present invention it being noted that the nose assembly 60 could be attached to any number of standard rotary installation tools with minor modifications to the nose assembly 60 in order to secure the nose assembly 60 to such installation tools. As can be seen in FIG. 6, the nose assembly 60 generally consists of the nose 58, a driver 62, an ejector 64 and a spring 66. The nose 58 has an internal bore 68 that is adapted to receive a driver 62 that has an internal bore 70 that is adapted to receive the ejector 64 and the spring 66. As shown in FIG. 4, the nose 58 has a plurality of nibs 56 disposed on one end of the nose 58. For the sake of simplifying the appearance of FIG. 4, the nose 58 is not shown with a flange disposed on the nose 58 as shown in FIGS. 6 and 7. The driver 62 is disposed within the bore 68 of the nose 58. At one end of the bore 70 of the driver 62 are splines or threads 72 that are adapted to engage the complementary shaped splines or threads 40 of the pin member 12. As previously mentioned, the splined engagement of the driver 62 and pin member 12 is particularly advantageous in pulling the installation tool towards the sleeve to assure reliable tool engagement of the nibs 56 with recesses 54. Optionally, on the exterior surface of the driver 62 are wrenching flats 74. The wrenching flats 74 are adapted to be engaged with standard tooling in order to threadedly engage threads of the driver 62 to a rotary drive shaft (not shown) of a standard rotary installation tool (not shown). It should be noted that the installation tool rotatably drives the driver 62 during actuation of the installation tool whereas the nose 58 is held stationary relative the rotatable driver 62. The function of the ejector 64 is to eject the head 38 after installation of the fastener 10 is completed. The ejector 64 and the spring 66 are disposed within the bore 70 of the driver 62. The spring 66 is compressibly held between the ejector 64 and the rotary drive shaft (not shown). The ejector 64 has a first diameter portion 78 and a second diameter portion 80. The first diameter portion 78 of the ejector 64 is of a diameter slightly less than the diameter of the internal bore 70 that does not have splines 72 disposed thereon and has a diameter that is greater than the diameter of the internal bore 70 that has splines 72 disposed thereon. The second diameter portion 80 of the ejector 64 is of a diameter slightly less than the diameter of the internal bore 70 that has splines 72 disposed thereon to enable the second diameter portion 80 of the ejector 64 to pass through the splined area of the internal bore 70 after the fastener 10 has been set to eject head 38 from the nose assembly 60 as shown in FIG. 7. Since the first diameter portion 78 has a diameter greater than the diameter of the internal bore 70 that has splines 72 disposed thereon, the ejector 64 remains within the internal bore 70 after the fastener 10 has been set. As shown in FIG. 7, the ejector 64 has head 82 adjacent to the second diameter portion 80 that is adapted to seat on an annular, outwardly facing, seat 84 at the area adjacent to the splines 72 of the driver 62. In the particular construction illustrated, the head 82 is frustoconical and the seat 84 is complementarily tapered so that the ejector remains within the driver 62 after head 38 is ejected from the nose assembly 60.

Prior to installing the fastener 10 into workpieces 24 and 26, the fastener 10 is assembled. Referring to FIG. 1, the assembly process comprises a series of steps which result in the portion of the sleeve 14 that is threaded being threadedly engaged with the pin member 12. Next, the body of the sleeve 14 undergoes a dimpling process wherein a small portion of an outer surface of the body of the sleeve 14 is physically deformed against the pin member 12. The dimpling process results in a small portion of the sleeve 14 material being displaced against the pin member 12 to cause sufficient engagement to prevent loosening of the pin member 12 from vibration after installation. Preferably, the dimpling is performed on the exterior surface of the sleeve adjacent to that portion of the sleeve 14 that is threadedly engaged with the pin member 12. The assembly process of the fastener 10 is then complete and the fastener 10 is prepared for installation.

The installation of the assembled fastener 10 involves the fastener 10 being used to secure a plurality of workpieces 24 and 26 together. The fastener 10 is inserted through aligned openings 20 and 22 in the workpieces 24 and 26 wherein the head 42 of the sleeve 14 is received against the outer surface of the accessible side workpiece 24, and a portion of the threaded portion 30 of the sleeve 14 extends out from the workpiece 26 and is adjacent to the outer surface of the blind side workpiece 26.

A rotary installation tool (not shown) with nose assembly 60 is provided to set the fastener 10. The splines or threads 40 of the pin member 12 are engaged with the complementary splines or threads 72 of the driver 62. Upon actuation of the tool by the end-user, the driver 62 is rotatably driven within the bore 68 of the nose 58 while the nose 58 is held stationary relative to the driver 62. The splined engagement between the pin member 12 and nose assembly 60 simultaneously pulls the nose assembly towards the fastener 10 during actuation of the tool to ensure proper engagement of the nibs 56 with the recesses 54 and rotatably torques the pin member 12 to effectively form the bulb 52 of the fastener 10. Relative axial movement of head 38 pushes ejector 64 within the internal bore 70 of the driver 62 that does not have splines and compresses spring 66 as shown in FIG. 6. As the pin member 12 is rotatably torqued and a relative axial force is applied to the nose assembly 60 during actuation of the installation tool, the nibs 56 of the nose 58 engage the complementary recesses 54 of the sleeve 14 which prevents the sleeve 14 from rotating relative to the nose 58 since the nose 58 is held stationary relative to the rotatably driven driver 62. Also, the rearward slope of the nibs 56 and nose 58 towards the blind side workpiece 26 prevents the nose 58 from camming out of the recesses 54 during the installation of the fastener 10. As previously mentioned, the problems associated with cam-outs related to the design of U.S. Pat. No. 2,971,425 are eliminated with the approach of the present invention.

As the installation tool rotates the pin member 12 and holds the sleeve 14 stationary, it is significant to note that there is no abrading or scratching of the head 42 of the sleeve 14 by the nibs 56 of the nose 58. Due to the engagement that is maintained between the nibs 56 and the recesses 54 during installation of the fastener 10, no slipping of the sleeve 14 relative to the nose 58 can occur. The recesses 54 and the nibs 56 are sloping rearwardly towards the blind side workpiece 26 and, as a result, provides consistent and predictable results and no slipping between the sleeve 14 and the nose 58 due to cam-outs.

Figure 2:
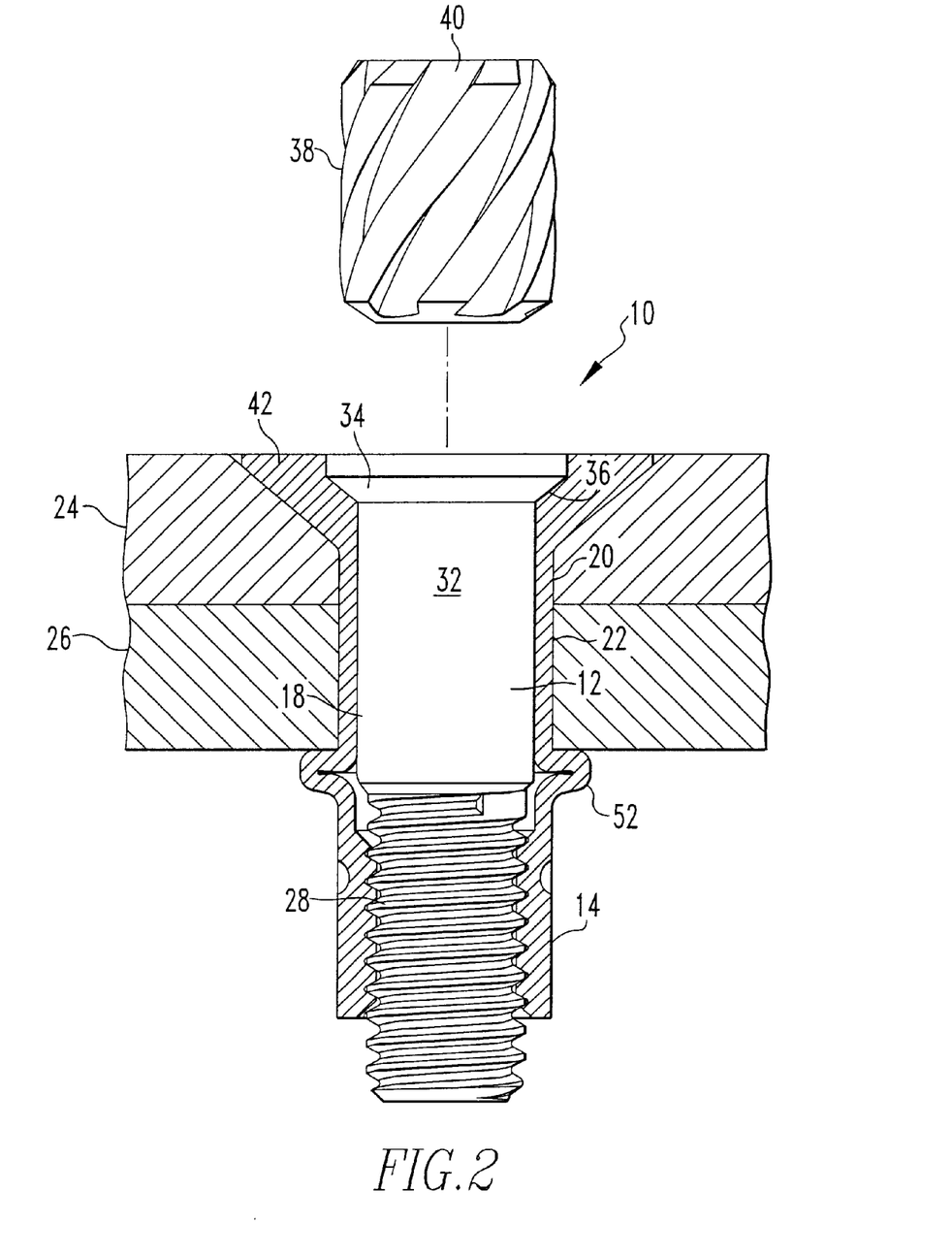
FIG. 2 is a partial cross-sectional view of the fastener of the present invention showing the components of the fastener after the fastener has been inserted through aligned openings in a plurality of workpieces and has been set.

The installation load applied by the installation tool results in the pin member 12 being further threaded with the sleeve 14 while deforming that portion of the sleeve 14 that is of a reduced wall thickness relative to the threaded portion 30 of the sleeve 14 that is adjacent to an outer surface of the blind side workpiece 26 to form the bulb 52 as shown in FIG. 2. When the bulb 52 is fully formed, further rotation of the pin member 12 stops. At this point, torsional load builds up in the pin member 12 and the breakneck groove 41 will fracture in torsional shear and break away along with the head 38 as shown in FIGS. 2 and 7. At this point, the spring 66 applies force against ejector 64 which ejects the severed head 38 from the nose assembly 60. Since the first diameter portion 78 has a diameter greater than the diameter of the internal bore 70 that has splines 72 disposed thereon, the ejector 64 remains within the internal bore 70 after the fastener 10 has been set. As shown in the FIGS. 2 and 7, the head 38 breaks away from the pin member 12 without any damage to the head 42. The remaining portion of the pin member 12 is flush with the outer surface of the head 42 of the sleeve 14.

In an alternate embodiment, it is possible to use the splined or threaded 40 head 38 of the pin member 12, the rearwardly sloping recesses 54 and nibs 56, and the relatively shallow recesses 54 of the present invention in multiple piece sleeve blind fasteners. For example, the splined 40 head 38 of the pin member 12, the rearwardly sloping recesses 54 and nibs 56, and the relatively shallow recesses 54 of the present invention could be used in the blind fasteners shown and described in U.S. Pat. Nos. 2,971,425, 5,498,110 and 5,634,751. The contents of these patents are incorporated by reference as if fully set forth herein. For the sake of simplicity, use of the splined 40 head 38 of the pin member 12, the rearwardly sloping recesses 54 and nibs 56, and the relatively shallow recesses 54 on the blind fasteners shown and described in U.S. Pat. Nos. 2,971,425, 5,498,110 and 5,634,751 will not be described herein it being noted that one of skill in the art would be able to modify the fasteners of U.S. Pat. Nos. 2,971,425, 5,498,110 and 5,634,751 to use the teachings of the present invention.

Having described the presently preferred embodiments, it is to be understood that the invention may be otherwise embodied within the scope of the appended claims.

What is claimed is:

1. A blind fastener in combination with an installation tool, the blind fastener for securing a plurality of workpieces together in response to a relative rotational force applied to the blind fastener, the workpieces having an accessible side workpiece and a blind side workpiece, the combination comprising:

a sleeve having a body that is internally threaded at one end of the sleeve and a head at another end of the sleeve, the threaded portion of the sleeve being adjacent to an internally smooth portion of the sleeve, the threaded portion of the sleeve transitioning to the smooth portion of the sleeve, the smooth portion of the sleeve having a reduced wall thickness relative to the threaded portion of the sleeve, the head having a generally smooth exterior surface with a plurality of rearwardly sloping recesses disposed in a generally circular orientation in the generally smooth exterior surface in the head of the sleeve; and a pin member having an elongated shank, the shank having a straight smooth portion received within the smooth portion of the sleeve and a threaded portion at one end of the pin member threadedly engaged with the threaded portion of the sleeve, the pin member having a first head adjacent to the shank that is seated within the sleeve and a second splined head adjacent to the first head, the pin member having a breakneck groove between the first head and the second head, the breakneck groove being adapted to fracture in torsional shear in response to the relative rotational force applied to the fastener with a splined driver engaging the second splined head that facilitates threading of the threads of the pin member with the threads of the sleeve during actuation of the installation tool secured to the splined driver, wherein the installation tool has a plurality of rearwardly sloping nibs disposed in a generally circular orientation on one end of a nose, wherein the nibs engage the recesses disposed in the head of the sleeve, do not cam out of the recesses and hold the sleeve stationary during actuation of the installation tool, and wherein the portion of the sleeve that is of a reduced wall thickness relative to the threaded portion of the sleeve and is adjacent to an outer surface of the blind side workpiece is annealed to facilitate deformation into a bulb to secure the plurality of workpieces together in response to the rotational force applied to the fastener with the installation tool.

2. The blind fastener of claim 1 wherein the wall thickness of the sleeve is gradually reduced along the smooth portion of the sleeve adjacent to the threaded portion of the sleeve to a point adjacent to the outer surface of the blind side workpiece.

3. The blind fastener of claim 1 wherein the wall thickness of the smooth portion of the sleeve adjacent to the threaded portion of the sleeve is abruptly reduced by a step in the sleeve to a wall thicknesss that is of a reduced wall thickness relative to the threaded portion of the sleeve.

4. The blind fastener of claim 1 wherein the nose has the plurality of nibs made of a non-deformable material.

5. The blind fastener of claim 1 further comprising a plurality of dimples disposed on the body of the sleeve to physically engage a portion of the sleeve with the pin member to create a friction lock between the sleeve and the pin member.

6. The blind fastener of claim 1 wherein the recesses are relatively shallow.

7. A blind fastener in combination with a nose assembly secured to an installation tool for securing a plurality of workpieces together, the combination comprising:

the blind fastener having a sleeve and a pin member, the sleeve having a head that has a generally smooth exterior surface with a plurality of rearwardly sloping recesses disposed in a generally circular orientation therein, the pin member having a splined head that breaks away from the blind fastener after the blind fastener has been set;

a nose having an internal bore, one end of the nose having a plurality of rearwardly sloping nibs disposed in a generally circular orientation thereon that engage the rearwardly sloping recesses disposed in the generally smooth exterior surface of the sleeve, and another end of the nose being adapted to be secured to the installation tool; and a driver having an internal bore, one end of the driver having a portion of the internal bore having splines disposed therein that engage the splined head of the pin member to facilitate threading of the pin member with the sleeve in response the relative rotational force applied to the fastener with the driver, and another end of the driver being adapted to be secured to the installation tool, the driver being disposed within the internal bore of the nose and rotatably movable within the bore relative to the nose; and wherein the nibs do not cam out of the recesses and hold the sleeve stationary during actuation of the installation tool.

8. The nose assembly of claim 7 wherein the sleeve of the blind fastener is adapted to deform into a bulb in response to the rotational force applied to the blind fastener.

* * * * *